(12) United States Patent
Aliaga et al.

(10) Patent No.: US 7,356,164 B2
(45) Date of Patent: Apr. 8, 2008

(54) METHOD AND APPARATUS FOR FINDING FEATURE CORRESPONDENCES BETWEEN IMAGES CAPTURED IN REAL-WORLD ENVIRONMENTS

(75) Inventors: Daniel G. Aliaga, Millington, NJ (US); Ingrid Birgitta Carlbom, Summit, NJ (US); Thomas A. Funkhouser, Pennington, NJ (US); Dimah V. Yanovsky, Plainsboro, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 684 days.

(21) Appl. No.: 10/452,019

(22) Filed: May 30, 2003

(65) Prior Publication Data

US 2004/0240707 A1    Dec. 2, 2004

(51) Int. Cl.
*G06K 9/00* (2006.01)
*G06K 9/32* (2006.01)
*G06K 15/10* (2006.01)

(52) U.S. Cl. .................. 382/103; 382/294; 345/527
(58) Field of Classification Search ............ 382/103, 382/190, 154, 206, 284, 107; 345/419, 427, 345/423
See application file for complete search history.

(56) References Cited

U.S. PATENT DOCUMENTS

| | | | | |
|---|---|---|---|---|
| 5,818,959 A | * | 10/1998 | Webb et al. | 382/154 |
| 6,078,701 A | * | 6/2000 | Hsu et al. | 382/294 |
| 6,084,592 A | * | 7/2000 | Shum et al. | 345/420 |
| 6,097,394 A | | 8/2000 | Levoy et al. | |
| 6,118,474 A | | 9/2000 | Nayar | |
| 6,192,156 B1 | * | 2/2001 | Moorby | 382/236 |
| 6,400,830 B1 | * | 6/2002 | Christian et al. | 382/103 |
| 6,633,317 B2 | * | 10/2003 | Li et al. | 715/854 |
| 6,724,915 B1 | * | 4/2004 | Toklu et al. | 382/103 |
| 6,795,090 B2 | * | 9/2004 | Cahill et al. | 345/646 |

(Continued)

FOREIGN PATENT DOCUMENTS

EP    1063614    *    6/2000

OTHER PUBLICATIONS

Lhuillieret al, "Image interpolation by joint view triangulation", Computer Vision and Pattern Recognition, 1999. IEEE Computer Society Conference on. vol. 2, Jun. 23-25, 1999 Page(s).*

(Continued)

*Primary Examiner*—Andrew W. Johns
*Assistant Examiner*—Andrae Allison

(57) ABSTRACT

Techniques for computing a globally consistent set of image feature correspondences across a wide range of viewpoints suitable for interactive walkthroughs and visualizations. The inventive approach takes advantage of the redundancy inherent in a dense set of images captured in a plane (or in higher dimensions, e.g., images captured in a volume, images captured over time, etc). The technique may detect features in a set of source images and track the features to neighboring images. When features track to the same position in the same image, they are flagged as potential correspondences. Among the potential correspondences, the technique selects the maximal set using a greedy graph-labeling algorithm (e.g., best-first order). Only correspondences that produce a globally consistent labeling are selected. After globalization is done, a set of features common to a group of images can be quickly found and used to warp and combine the images to produce an interpolated novel view of the environment.

19 Claims, 6 Drawing Sheets

U.S. PATENT DOCUMENTS

| | | | |
|---|---|---|---|
| 6,975,755 B1* | 12/2005 | Baumberg | 382/154 |
| 7,146,022 B2* | 12/2006 | Masukura et al. | 382/103 |
| 2002/0164067 A1* | 11/2002 | Askey et al. | 382/154 |
| 2002/0172413 A1* | 11/2002 | Chen | 382/154 |

OTHER PUBLICATIONS

Shi et al,"Good Features to Track", Technical Report: TR93-1399, Year of Publication: 1993.*

Kang, "A Survey of Image-based Rendering Techniques", http://www.hpl.hp.com/techreports/Compaq-DEC/CRL-97-4.pdf, 1997.*

Chen, "QuickTime VR: an image-based approach"International Conference on Computer Graphics and Interactive Techniques archiveProceedings of the 22nd annual conference on Computer graphics and interactive techniques table of contents pp. 29-38, 1995.*

Debevee, "Modeling and Rendering Architecture from Photographs: A hybrid geometry- and image-based approach", Proceedings of the 23rd annual conference on Computer graphics and interactive techniques table of contents pp. 11-20, 1996.*

U.S. Appl. No. 10/452,314, filed May 30, 2003, "Method and Apparatus for Compressing and Decompressing Images Captured from Viewpoints Throughout N-Dimensional Space".

U.S. Appl. No. 10/452,020, filed May 30, 2003, "Method and System for Creating Interactive Walkthroughs of Real-World Environment from Set of Densely Captured Images".

U.S. Appl. No. 10/449,929, filed May 30, 2003, "Method and Apparatus for Computing Error-Bounded Position and Orientation of Panoramic Cameras in Real-World Environments".

U.S. Appl. No. 10/156,189, filed Jun. 29, 2002, "Camera Model and Calibration Procedure for Omnidirectional Paraboloidal Catadioptric Cameras".

U.S. Appl. No. 10/122,337, filed Apr. 16, 2002, "Method and System for Reconstructing 3D Interactive Walkthroughs of Real-World Environments".

Shree K. Nayar, "Catadioptric Omnidirectional Camera," IEEE Computer Vision and Pattern Recognition (CVPR '97), 7 pages, 1997.

Henry Fuchs, "On Visible Surface Generation by a Priori Tree Structures," Computer Graphics, Proceedings of SIGGRAPH '890, pp. 124-133, 1980.

B. Triggs et al., "Bundle Adjustment—A Modern Synthesis," Vision Algorithms: Theory and Practice, Springer-Verlag, pp. 1-71, 2000.

J. Shi et al., "Good Features to Track," Proceedings of IEEE on Computer Vision and Pattern Recognition (CVPR94), Seattle, 8 pages, Jun. 1994.

E.H. Adelson et al., "The Plenoptic Function and the Elements of Early Vision," Computational Models of Visual Processing, MIT Press, pp. 1-20, 1991.

M. Levoy et al., "Light Field Rendering," Proceedings of ACM SIGGRAPH 96, pp. 1-12, 1996.

S. Teller et al., "Calibrated Registered Images of an Extended Urban Area," IEEE Computer Vision and Pattern Recognition (CVPR), pp. 1-20, 2001.

R. Koch et al., "Calibration of Hand-held Camera Sequences for Plenoptic Modeling," IEEE International Conference on Computer Vision (ICCV), 7 pages, 1999.

Camillo J. Taylor, "VideoPlus," IEEE Workshop on Omnidirectional Vision, 8 pages, Jun. 2000.

L.S. Nyland et al., "Capturing, Processing and Rendering Real-World Scenes," Videometrics and Optical Methods for 3D Shape Measurement Techniques, Electronic Imaging Photonics West, vol. 2309, 9 pages, 2001.

* cited by examiner

FIG. 1

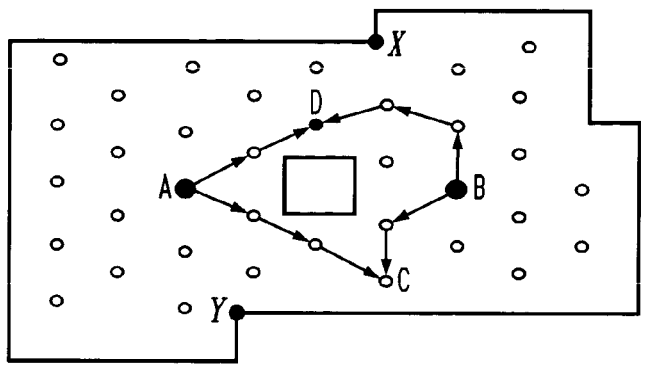

FIG. 2

```
// Initialize
Build Delaunay triangulation
Initialize priority queue

// Detect features
for each image A
  Detect features F
  if (quality(F) > threshold)
    Insert F into A REPEAT
  // Propagating features
  for each image A
    for each [neighbor] image B
      for each untracked feature F in A {
        Track F to B
        if (track quality > threshold) {
          for each feature G in B
            if (match (F,G) > threshold)
              Insert (F,G) into priority queue
          if (F matched no features of B)
            Insert F into B
        }
      }
  // Relabeling features
  While priority queue is not empty {
    Pop "best" potential correspondence (F,G)
    If (consistent(F,G)) Relabel G->F
  }

UNTIL no untracked features or max iterations
```

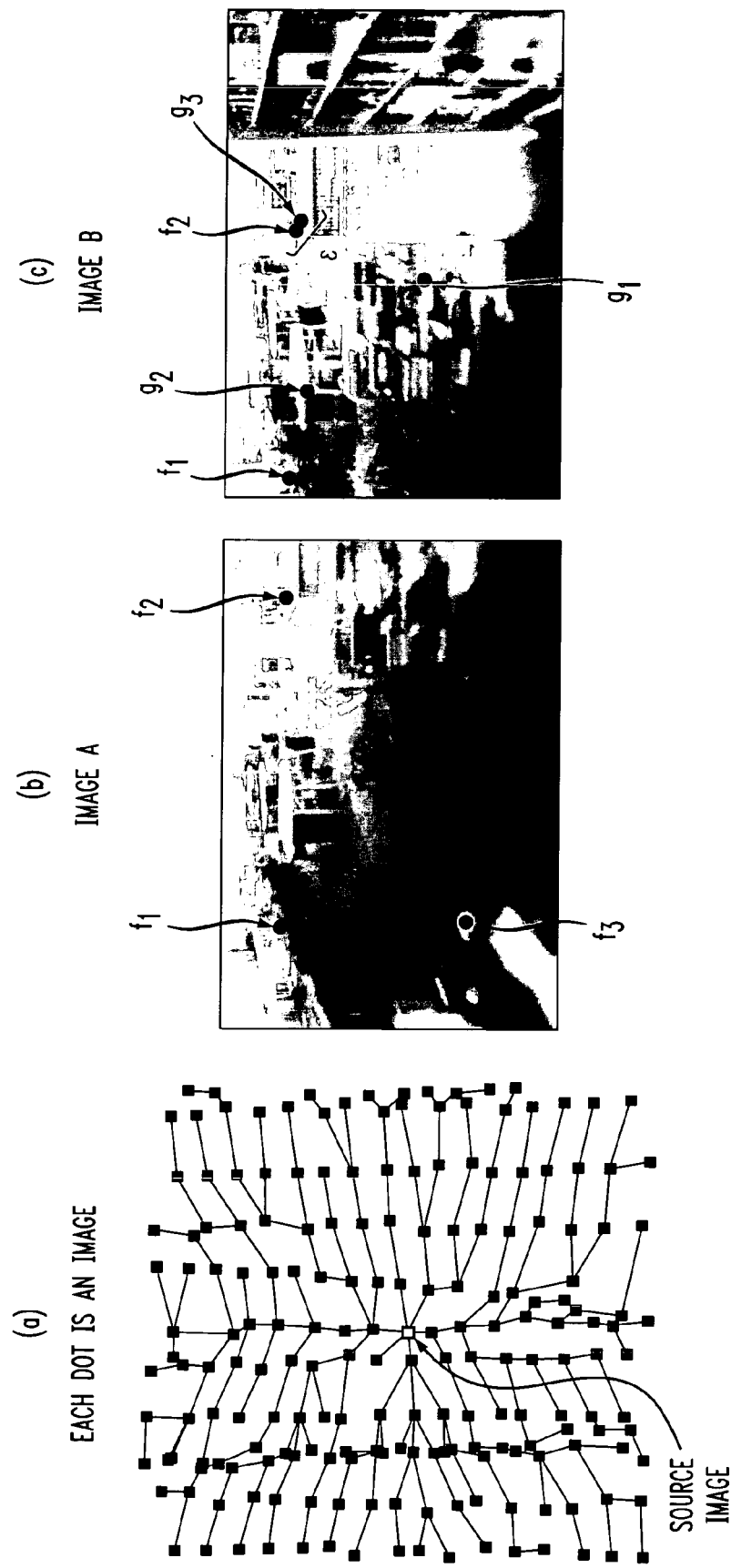

METHOD AND APPARATUS FOR FINDING FEATURE CORRESPONDENCES BETWEEN IMAGES CAPTURED IN REAL-WORLD ENVIRONMENTS

CROSS REFERENCE TO RELATED APPLICATIONS

This application relates to U.S. patent applications identified as Ser. No. 10/449,929 entitled "Method and Apparatus for Computing Error-Bounded Position and Orientation of Panoramic Cameras in Real-world Environments;" Ser. No. 10/452,314 entitled "Method and Apparatus for Compressing and Decompressing Images Captured from Viewpoints Throughout N-dimensional Space;" and Ser. No. 10/452,020 entitled "Method and System for Creating Interactive Walkthroughs of Real-world Environment from Set of Densely Captured Images," all filed concurrently herewith and commonly assigned, the disclosures of which are incorporated by reference herein.

FIELD OF THE INVENTION

The present invention relates to image processing techniques and, more particularly, to techniques for finding feature correspondences between images captured in real-world environments.

BACKGROUND OF THE INVENTION

One of the most challenging problems in computer graphics today is rendering visually compelling three-dimensional (3D) environments. For real-world environments, a key problem is to recreate the complex interaction between geometric and photometric properties.

Image-based rendering (IBR) attempts to address this problem by capturing images of the environment and then creating novel views by re-sampling the images which already contain the geometric and photometric properties. One example of an application that uses IBR techniques is an interactive walkthrough. An interactive walkthrough is a computer graphics application where an observer moves within a virtual environment. For an interactive walkthrough application to be effective, rendering cannot be limited to coincide with the captured viewpoints or captured paths, but instead requires image reconstruction from arbitrary viewpoints or along arbitrary viewpoint paths.

The main tasks for an IBR system are: (1) to acquire a sampling of calibrated reference images; (2) to warp reference images so that their centers-of-projection coincide with the location of the virtual observer; and (3) to combine the warped images from multiple reference images to form a novel image at the location of the virtual observer. The first and third of these tasks have been well studied in recent years. However, the second task (to warp reference images so that their centers-of-projection coincide with the location of the virtual observer) has still not been addressed adequately.

Conventional approaches for performing the second task require computing either pixel correspondences between the images or an accurate 3D scene geometry. However, it is difficult to achieve accurate pixel correspondence, and the 3D scene geometry is often not available and even more difficult to extract from a set of images. As a result, most IBR systems have produced novel images with noticeable blurring and ghosting artifacts, or they have been demonstrated only with distant or synthetic scenes.

Thus, there exists a need for techniques that overcome the above-mentioned drawbacks by providing improved techniques for warping images captured in real-world environments so as to enable improved arbitrary viewpoint rendering in such applications as interactive walkthroughs.

SUMMARY OF THE INVENTION

The present invention provides techniques for finding feature correspondences between images captured in real-world environments so as to enable improved arbitrary viewpoint rendering in applications such as interactive walkthroughs.

In one aspect of the invention, a technique for processing images captured from an environment comprises the following steps/operations. Features are detected in a set of source images. The features are tracked to destination images that surround the source images. Potential correspondences are identified between features from different source images that track to the same image and that satisfy a feature similarity metric. A maximal set of corresponding features is then selected from among the potential correspondences to form a globally consistent set of image features.

The features may be tracked from each source image along a set of non-intersecting paths that spread radially outwards. The set of source images may comprise a subset of the images captured from the environment.

Further, the feature similarity metric may be satisfied via any of multiple viewpoint paths between images. Further, the feature similarity metric may comprise one or more of the following thresholds: (i) a maximum distance in pixels between tracked features in the same image; (ii) a tracking quality threshold; (iii) a feature quality threshold; and (iv) a feature correlation threshold. The maximal set selection step may utilize a re-labeling process to select a globally consistent set of image features.

Still further, the inventive technique may comprise the step of utilizing the globally consistent set of image feature correspondences to reconstruct one or more images. Image reconstruction may comprise the steps of: determining features common to a group of images based on the globally consistent set of image feature correspondences; and warping and combining the images to generate an interpolated novel view of the environment.

Also, the feature tracking step and the potentially corresponding feature identification step may be interleaved with the maximal set selection step.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating the concept of multiple tracking paths, according to an embodiment of the present invention;

FIG. 2 is a diagram illustrating a pseudo code representation of a feature correspondence methodology, according to an embodiment of the present invention;

FIGS. 3A through 3C are diagrams illustrating feature propagation, according to an embodiment of the present invention;

DETAILED DESCRIPTION OF PREFERRED EMBODIMENTS

Figure 4:
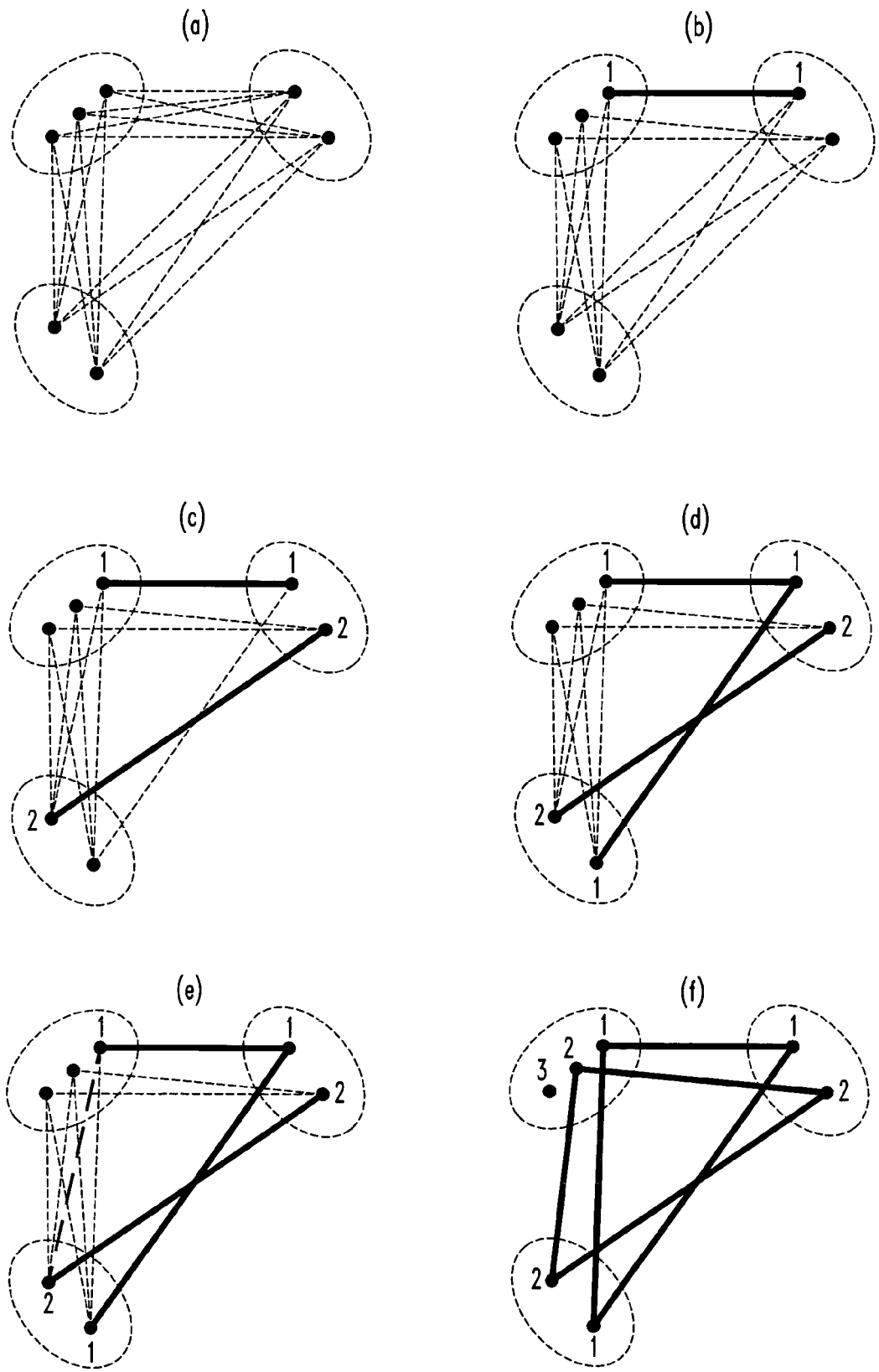
FIGS. 4A through 4F are diagrams illustrating feature re-labeling, according to an embodiment of the present invention.

The following description will illustrate the invention in the context of an exemplary image-based rendering environment such as an interactive walkthrough application. It should be understood, however, that the invention is not necessarily limited to use with any particular application or environment. The invention is instead more generally applicable to any application or environment in which it is desirable to effectively find feature correspondences between images captured in real-world environments.

Thus, as will be explained in detail herein, the present invention provides techniques for warping images so as to enable high-quality image reconstruction in interactive IBR walkthrough systems. Advantageously, by way of example, the inventive techniques are: (1) able to produce novel images without noticeable ghosting or blurring artifacts; (2) robust to inaccuracies in camera pose estimates; (3) robust to inaccuracies in 3D proxy models; (4) fully automatic; and (5) able to warp any combination of images to form a novel image.

This last advantage (ability to warp any combination of images to form a novel image) is particularly important for the real-time needs of an IBR system where a pre-fetching process may not be able to load all images into memory quickly enough to keep up with the virtual observer motion. In these cases, the reference images captured from locations closest to the observer viewpoint may not be available in memory, and the system must warp and combine more distant images from its memory-resident cache.

In general, the inventive techniques preferably create novel views by warping and combining a set of panoramic reference images densely captured throughout an n-dimensional space (e.g., a plane, a volume, over time, etc.). Features are detected in a set of source images and are tracked to other images. A feature may be an edge, corner, point, or any clearly identifiable marking or object in the environment. If an image has two or more sets of features tracked to it, a matching operation may be performed. Matching tracked features implies testing if they are to be considered the same environment feature. To be considered the same environment feature, the features must satisfy a similarity metric. This metric may consist of several factors including, for example, distance between the tracked features, tracking quality, feature quality, and correlation (a correlation scheme may be used to determine if the pixel neighborhood surrounding each feature is similar). Features that satisfy the similarity metric are flagged as a potential correspondence.

A greedy algorithm is then used to select the best subset of potential correspondences while ensuring a consistent global feature labeling. This approach finds feature correspondences across a wide range of viewpoints in difficult scenes (e.g., with occlusions) where many features would be lost by a conventional feature tracker. Moreover, the invention is able to produce high-quality novel images in a walkthrough system, even when reference images are separated by large distances and/or are based on poor camera pose estimates.

Furthermore, as will be explained in detail herein, the invention provides a new approach for finding correspondences between features in images spread over a wide range of viewpoints. Using a graph formulation over a dense set of reference images, the invention is able to find more feature correspondences than conventional algorithms based on tracking of features along a single sequence of images. The detailed description to follow will also provide an explanation of how to include globalized feature correspondences, detected in accordance with the invention, in an interactive IBR walkthrough system. In one embodiment, the inventive techniques enable production of novel images at a simulated observer's viewpoint at 15 to 20 frames per second as the user interactively controls the simulated observer viewpoint.

The remainder of the detailed description is divided into the following sections for ease of reference: (I) Feature Globalization; (II) Image Reconstruction; and (III) Illustrative Implementations.

I. Feature Globalization

As will be explained in illustrative detail below, the invention provides a methodology for finding in a large collection of images a set of feature correspondences suitable for warping reference images in an interactive IBR system. The input to the exemplary embodiment of the algorithm is a set of panoramic images (e.g., 10,000 images) captured densely on an eye-height plane throughout a large environment and calibrated with position and orientation information. The output is a set of feature locations in each image (e.g., 500-1000 features) along with a globally consistent labeling, where two features have the same label if they correspond to the same scene element. The features common to a group of images aid in the warping for the reconstruction of novel views in an interactive IBR walkthrough system.

While a variety of conventional image capture techniques could be employed to generate the dense set of images, in a preferred embodiment, images are captured using the capture subsystem and calibration techniques described in the U.S. patent application identified as Ser. No. 10/122,337 filed on Apr. 16, 2002 and entitled "Method and System for Reconstructing 3D Interactive Walkthroughs of Real-World Environments;" the U.S. patent application identified as Ser. No. 10/156,189 filed on Jun. 29, 2002 and entitled "A Novel Camera Model and Calibration Procedure for Omnidirectional Paraboloidal Catadioptric Cameras;" and the U.S. patent application identified as Ser. No. 10/452,020 filed concurrently herewith and entitled "Method and System for Creating Interactive Walkthroughs of Real-world Environment from Set of Densely Captured Images," the disclosures of which are incorporated by reference herein. Further, while a variety of conventional pose estimation techniques could be employed to generate pose information, in a preferred embodiment, pose estimation is provided in accordance with the techniques described in the U.S. patent application identified as Ser. No. 10/449,929 filed concurrently herewith and entitled "Method and Apparatus for Computing Error-Bounded Position and Orientation of Panoramic Cameras in Real-world Environments," the disclosure of which is incorporated by reference herein.

Regarding feature correspondence, a simple approach might be to detect features in one "source" image (e.g., in the center of the environment) and track them to all other "destination" images. This approach works for a small range of images around the source. However, as tracking moves outside the small range, features quickly become lost due to several reasons which may include occlusion changes, lighting changes, and feature drift.

Accordingly, in a preferred methodology of the invention, features are detected in many source images (which may range from several to all images) and tracked from each source image to destination images within a local area (i.e., where tracking is relatively robust). Then, potential correspondences are identified whenever two features satisfy the feature similarity metric. An iterative feature-re-labeling process is then used to extract a globally consistent set of correspondences over the entire environment. This approach overcomes the limitations of conventional feature tracking since it relies upon tracking only over short distances. Yet, the approach identifies feature correspondences over a large range of viewpoints because feature re-labeling propagates correspondences across regions.

A key feature of the inventive approach is that two features are said to correspond if they satisfy the feature similarity metric via any of the multiple feature tracking paths. In a typical embodiment of the similarity metric, this implies, among other factors, that the features track to within a small epsilon of each other in an image. The concept behind this feature is illustratively depicted in accordance with FIG. 1.

FIG. 1 is a floor plan, and the small circles depict reference image locations. Consider trying to find the correspondences of two features, X and Y, between two images, A and B, among a dense set of reference images captured throughout the environment. Due to occlusion of an obstacle in the middle of the environment (rectangle in FIG. 1), it is difficult to track both features along any single path of viewpoints between images A and B. Feature X may track along a sequence of images captured on one side of the obstacle, and feature Y may track along a different sequence of viewpoints on the other side of the obstacle.

With conventional tracking, no single path can track both features all the way from one image to the other. Moreover, features are lost along any path due to changes in lighting or sampling. However, advantageously, the invention is able to find the correspondence for both X and Y by matching features when they track to approximately the same location in any image (e.g., C or D). This redundancy allows the invention to find potential feature correspondences more robustly and across a wider range of viewpoints than conventional feature tracking techniques.

In the following three subsections, main components of the inventive feature correspondence methodology are illustratively described. First, a feature propagation process is described that starts with features detected in a set of source images and tracks them radially outwards to destination images. Second, a feature-re-labeling process is described. Third, several optimizations that enhance the performance of the inventive methodology are described. FIG. 2 illustrates pseudo code for implementing the inventive techniques. Given such illustrative pseudo code and the detailed description of the processes of the invention provided herein, one of ordinary skill in the art would be able to implement a feature correspondence methodology according to the present invention.

A. Feature Propagation

Referring to FIGS. 3A through 3C, an illustrative feature propagation process will now be described. There are multiple image paths along which detected features can track and propagate outwards from each source image. Many possible feature propagation strategies may be used. The feature correspondence methodology of an embodiment of the invention attempts to minimize feature-tracking error by using a shortest-path traversal of a two-dimensional (2D) triangulation of the image viewpoints. Starting with a source image, feature tracking extends outwards from each image along a set of non-intersecting tracking paths (FIG. 3A) until either no more features can be reliably tracked or a maximum number of images have been traversed.

The inventive methodology initializes feature propagation by detecting features in every source image using a "best feature" detection algorithm such as that described in J. Shi et al., "Good Features to Track," IEEE Computer Vision and Pattern Recognition, pp. 593-600, 1994, the disclosure of which is incorporated by reference herein. However, other algorithms could be used. This algorithm computes the best (point) features in an image as the regions where there is an intersection of nearly orthogonal edges. Each initial feature is assigned a unique label, marked as untracked in its image, and inserted into a feature list associated with its image. FIG. 3B shows an example image A with a few labeled features. It is to be understood that the actual reference images are panoramic images. Planar re-projections are shown in FIGS. 3B and 3C for the sake of clarity.

To propagate the features, the inventive methodology finds feature correspondences to the next neighboring image along every tracking path. In FIG. 3C, the next neighboring image B along one tracking path from image A is shown. To obtain candidate correspondences for this neighboring image B, the inventive methodology determines the subset of untracked features in image A with labels different than those already appearing in image B. For each feature in that subset (e.g., $f_1$, $f_2$, $f_3$), the methodology tracks the feature to image B and computes a track quality term. The track quality term is the correlation of the feature in image A with itself in image B. If the track quality is above a user specified threshold, the methodology considers merging the tracked features into the set of features associated with image B. If a feature $f_i$ tracks to a position within a user specified distance threshold $\epsilon$ of another feature $g_j$ in image B, then the pair ($f_i$, $g_j$) is considered as a potential correspondence. Otherwise, the tracked features are added to the feature list of image B and marked untracked in image B.

B. Feature Re-Labeling

After every image has tracked features to its neighbors, the inventive feature correspondence methodology has a list of potential feature correspondences (i.e., pairs of features that track to the same location in some image). Since there is no guarantee that a feature detected in a source image will be tracked to the same position through different paths to a destination image, inconsistencies may appear in which two distinct features in one image are thought to correspond to the same feature in another image.

In accordance with the invention, these inconsistencies may be resolved by casting the problem of finding the best globally consistent set of feature correspondences as a graph-labeling problem. Using a greedy graph-labeling algorithm, the inventive methodology accepts potential correspondences in best-first order. The best correspondence is that of the most similar feature pair (e.g., closest to each other and with the highest track quality). Initially, a graph is created in which each vertex represents a unique feature detected in a reference image and each edge represents a potential correspondence between two features. Using a priority queue, the methodology iteratively pops the best potential feature correspondence off the queue and checks to see whether accepting it produces a consistent labeling (i.e., no two features in the same image have the same label). If so, the potential correspondence is accepted and the features are merged into one. The lower-value label is used as the new label and the position of the higher quality feature is used as the feature position of the corresponded feature. Since the feature distance threshold $\epsilon$ is typically one pixel or less, the transition from one feature to another usually goes unnoticed.

FIGS. 4A through 4F show an example of the graph-based algorithm of the invention. The example is a simple example with three images (dotted ovals), seven detected features (black dots), and many potential correspondences (dashed lines), as shown in FIG. 4A. The highest priority potential correspondence associates the two top-most features, and accepting this correspondence does not produce an inconsistent labeling. So, the process re-labels these two features (1) and removes other potential correspondences that would obviously produce inconsistencies (FIG. 4B). The process continues accepting potential correspondences in priority order (FIGS. 4C-4D) until no more can be found. Sometimes, the highest priority potential correspondence remaining would produce an inconsistent labeling (FIG. 4E), in which case, it is rejected. Finally, at the end of the process, every feature has been given a unique global label and feature correspondences are indicated by the remaining (dark solid) edges in the graph (FIG. 4F). Of course, it is to be understood that this example is made simple for explanation purposes only. The graphs computed for typical datasets use thousands of images and each image often contains a thousand or more features.

C. Optimizations

The feature correspondence methodology described above may employ one or more optimizations.

Figure 5:
FIG. 5 is a diagram illustrating image regions, according to an embodiment of the present invention.

In accordance with a first optimization, in order to reduce the effects of feature jitter and to reduce the number of features to track, features are detected only in a subset of the images. Specifically, the images are partitioned into regions and features are detected only at the central image (source) within each region. The concept of regions is illustrated in FIG. 5. Of course, the size of the regions can have a significant impact on the performance of the feature-correspondence algorithm. On one extreme, if every image is in its own region, then features are detected at every image, and the system must track a large number of features. On the other extreme, if all images are in a single region, then features are detected and tracked from only one image. In a preferred embodiment, region sizes are chosen by estimating the distance along which features can be tracked reliably. This approach initializes all images within each region with a large set of tracked and globally-labeled features and allows the algorithm to begin by considering potential correspondences at the boundaries between regions.

In accordance with a second optimization, in order to avoid unnecessary feature tracking, the feature correspondence methodology alternates between feature tracking and feature re-labeling. This is illustrated in accordance with the pseudo code shown in FIG. 2. Rather than tracking features as far as possible before resolving potential correspondences, the methodology interleaves tracking features to immediate neighbor images and resolving potential correspondences with the greedy re-labeling algorithm. This approach avoids further tracking of features that can be merged with other features at the same location in the same image.

These two practical optimizations not only reduce the compute time required by the feature correspondence methodology, but they also help its stability. Detecting features in only one image of each region avoids much of the noise typically found in feature detectors, and merging/re-labeling nearby features reduces the chances of erroneously finding correspondences between tracked features. The result is a practical and automatic algorithm for finding a globally consistent set of image features.

II. Image Reconstruction

Once a globalized set of features is obtained, a novel view may be generated by warping and combining surrounding reference images. In accordance with an illustrative approach described in the above-referenced U.S. patent application identified as Ser. No. 10/452,020 filed concurrently herewith and entitled "Method and System for Creating Interactive Walkthroughs of Real-world Environment from Set of Densely Captured Images," the viewpoints of the reference images are triangulated and the triangle that contains the novel viewpoint is found. Then, the three reference images surrounding the novel viewpoint are warped so that their center-of-projection correspond to the location of the novel viewpoint. Since a globalized set of features is available, in accordance with the invention, the image reconstruction process is not limited to combining only adjacent images. If only a sparse subset of the captured images is available, the images will still have common features and novel views can be constructed. Although the reconstruction methodology is able to reproduce specularities and changing occlusions, it does not explicitly account for these effects (rather, it relies on dense sampling). Thus, using fewer images may hinder reproducing specularities and proper occlusion changes.

The reconstruction methodology finds the common features by iterating through all the features of one reference image and determining the subset present in the other reference images. In addition, with each feature, the original feature quality (e.g., how good a point feature it is), the tracking quality, and the iteration at which the feature was globalized are stored. If so desired, only features that exceed set quality and maximum iteration thresholds are used for reconstruction.

Since features are only present at or near image details, some large parts of an image might have few or no features. This creates large triangles that would not warp and render the image as desired. In these cases, the reconstruction methodology dynamically subdivides these large triangles and inserts feature points. To calculate the correspondences for these feature points, the methodology may use a geometric proxy. The proxies used for this purpose range from a box to a simple model consisting of a few dozen polygons.

III. Illustrative Implementations

Given the above detailed description of principles of the present invention, the following section will describe some illustrative implementations of the invention.

Figure 6:
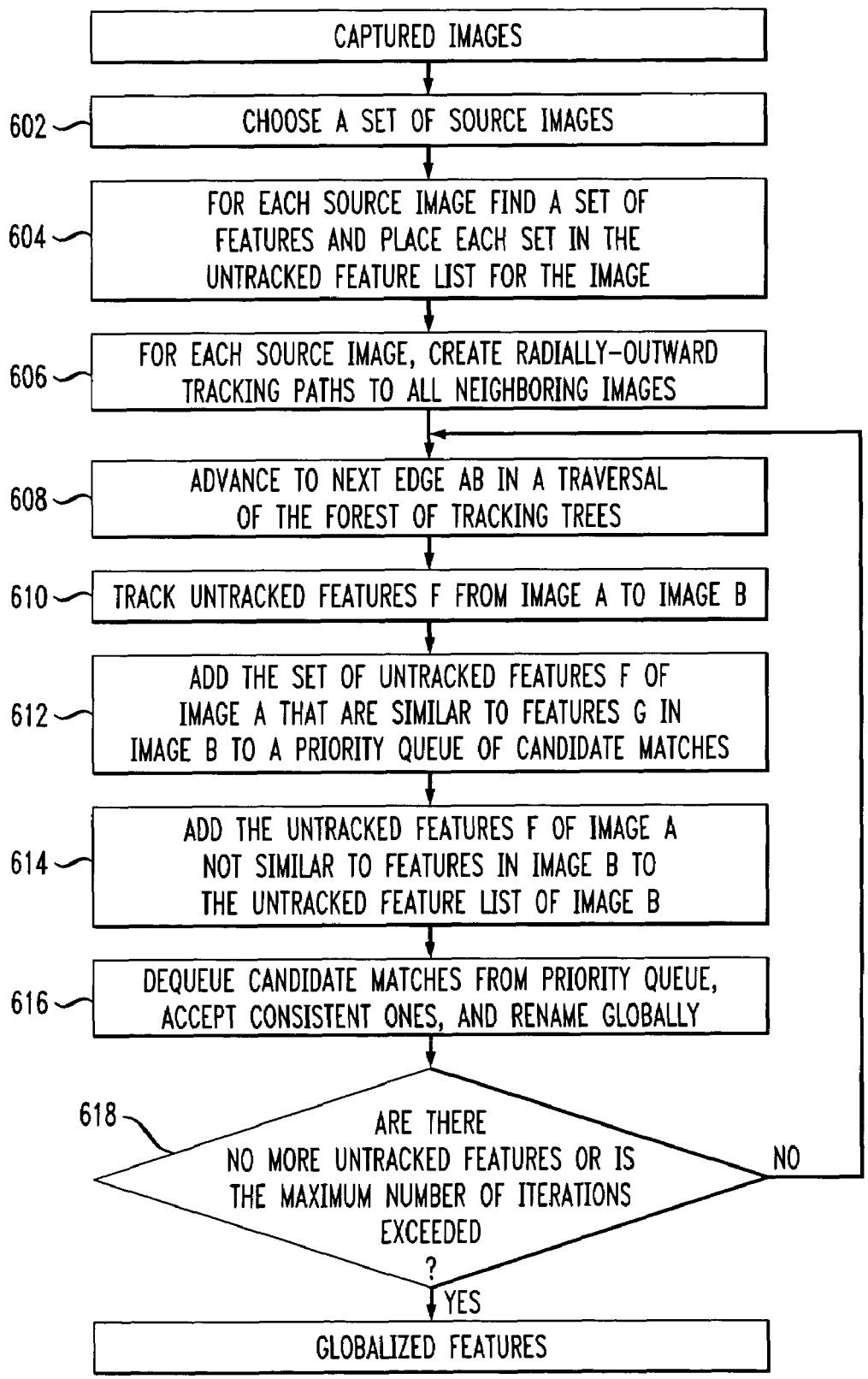
FIG. 6 is a flow diagram illustrating a feature correspondence methodology, according to an embodiment of the present invention.

Referring now to FIG. 6, a flow diagram illustrates a feature correspondence methodology, according to an embodiment of the present invention. As explained above, the methodology 600 provides for globalization of image features by establishing correspondences between the image features detected in a dense collection of images.

First, in step 602, a set of source images are identified. Source images can be sparsely distributed or every image can be a source image. Their abundance trades off globalization quality for speed.

In step 604, for each source image, a set of features is detected and placed in a list of untracked features associated with the image. By way of example, as explained above, every image may be a source image or the set of images may be divided into regions and the center image from every region selected as a source image.

In step 606, the features are tracked to the neighboring images in a radially outward fashion. By way of example, as explained above, a non-intersecting traversal may be computed via a breadth-first traversal of a triangulation of the centers-of-projection (COPs) of the images surrounding each source image.

In step 608, all features are tracked from their source images to their immediate neighbors and from there to the next set of neighbors and so forth. By way of example, various traversal orders can be followed. As explained above, one process that may be used is to track all features in a balanced way by performing a breadth-first traversal of the forest of tracking trees.

In step 610, along each tracking edge AB, the untracked features F of image A are tracked to image B. By way of example, as explained above, standard feature tracking methods may be used for this purpose.

In step 612, the set features G in B that are similar to the tracked features of A are placed into a queue representing all candidate feature matches. By way of example, as explained above, similar features may be those that have been tracked well, are close in screen-space, and correlate well.

In step 614, features of A that do not match some feature in image B are placed into the untracked list of image B.

In step 616, the candidate feature matches in the queue are processed one by one. Matches that exceed the matching criteria and are globally consistent are accepted and the features are globally renamed to the same label. By way of example, as explained above, the matching criterion may be a thresholded similarity value. A consistent match implies that the same feature cannot exist in any image with two names.

Once there are no more untracked features or a maximum number of tracking iterations have been reached, as determined in accordance with step 618, the loop terminates and the methodology is complete. A set of globally consistent features is stored and/or output for use in subsequent operations, e.g., image construction.

By way of example only, an implementation used to realize principles of the present invention will now be described. The above-described inventive algorithms were implemented in C/C++ using, OpenGL, GLUT, and GLUI on both a Pentium IV 1.7 MHz computer with an NVidia GeForce3 Ti 500 graphics card and on a SGI Onyx2 R10000 250 Mhz computer with InfiniteReality2 graphics. Images and features were sorted and stored in a database. We stored, with each image, the list of features it contains and, with each feature, the list of images that contain it. Both of these access mechanisms are used during feature globalization.

We utilized a feature correspondence methodology that estimates the position of the features to track in the destination image. Then, the methodology searches in the neighborhood of the predicted position for the tracked feature that best correlates with the original feature. The implementation used multiple processors and restricted the correlation search to epipolar curves (applying epipolar geometry to the panoramic images of the camera used in the embodiment of the invention produces curves and not straight lines).

The reconstruction methodology was implemented by blending triangular meshes using either multi-texturing on the NVidia board or the accumulation buffer on the SGI. After extracting the common set of globalized features for a given group of reference images, the reconstruction methodology triangulated the features in one image and generated a mesh. Using each reference image's feature positions and the distance from the novel viewpoint to each reference image's viewpoint, the reconstruction methodology created interpolated feature positions. Each reference image was then downloaded to the graphics engine and rendered as a textured mesh. A reference image was warped by rendering the mesh using the interpolated feature positions as vertices but using the original feature positions as the texture coordinates.

Figure 7:
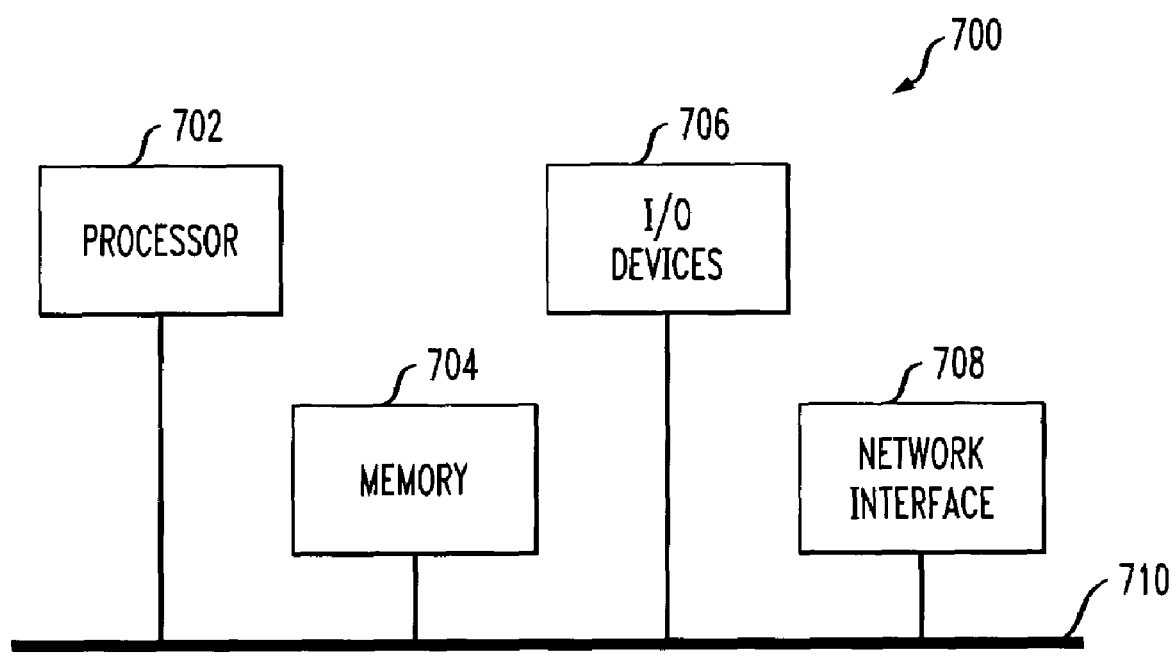
FIG. 7 is a block diagram illustrating a generalized hardware architecture of a computer system suitable for implementing one or more functional components of a feature correspondence system, according to an embodiment of the present invention.

Referring finally to FIG. 7, a block diagram illustrates a generalized hardware architecture of a computer system suitable for implementing one or more of the functional components/steps of feature correspondence methodologies as depicted in the figures and explained in detail herein. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network. Also, the components/steps of the invention may be implemented in a client/server architecture. Thus, the computer system depicted in FIG. 7 represents a client device or a server.

As shown, the computer system 700 may be implemented in accordance with a processor 702, a memory 704, I/O devices 706, and a network interface 708, coupled via a computer bus 710 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., cameras, keyboards, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Advantageously, as described in detail herein, the present invention describes a new algorithm for computing a globally consistent set of image feature correspondences across a wide range of viewpoints suitable for interactive walkthroughs and visualizations. The inventive approach takes advantage of the redundancy inherent in a dense set of images captured in an n-dimensional space (e.g., images captured from viewpoints in a plane, in a volume, over time, etc). The method detects features in a set of source images and tracks features radially outwards to neighboring images. When features tracked to the same image satisfy a feature similarity metric, they are flagged as potential correspondences. Among the potential correspondences, the invention selects the maximal set using a greedy graph-labeling algorithm (e.g., best-first order). Only correspondences that produce a globally consistent labeling are selected.

Furthermore, a key feature of the inventive approach is that it exploits the multiple paths that can be followed between images in order to increase the number of feature correspondences and the distance between corresponded features. In particular, two features are said to correspond if they satisfy the feature similarity metric via any of the multiple feature tracking paths. In a typical embodiment of the similarity metric, this implies that the features track to within a small epsilon of each other in an image. Thus, correspondences can be established for features even though no correspondence exists along any single path.

Still further, after globalization is done, a set of features common to a group of images can be quickly found and used to warp and combine the images to produce an interpolated novel view of the environment. The images can be warped by triangulating the features and using either: (a) graphics hardware to warp the images; or (b) software-based image morphing techniques.

With this inventive approach, multiple benefit-cost tradeoffs can be performed. We can start with a small number of source images and rely heavily on feature tracking or, conversely, we can start with a large number of source images and thus require more feature matching operations. Simultaneously, we can vary the amount of globalization by varying the number of globalization iterations. At the expense of time, more iterations tend to produce more globalization.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of processing images captured from an environment, comprising the steps of:
   detecting features in a set of two or more source images;
   tracking the features to two or more destination images that surround the two or more source images;
   identifying potential correspondences between features from different source images that track to the same image and that satisfy a feature similarity metric; and
   selecting a maximal set of corresponding features from among the potential correspondences to form a set of image feature that is globally consistent across the set of two or more source images.

2. The method of claim 1, wherein the features may be tracked from each source image along a set of non-intersecting paths that spread radially outwards.

3. The method of claim 1, wherein the set of source images comprises a subset of the images captured from the environment.

4. The method of claim 1, wherein the feature similarity metric may be satisfied via any of multiple viewpoint paths between images.

5. The method of claim 4, wherein the feature similarity metric comprises one or more of the following thresholds: (i) a maximum distance in pixels between tracked features in the same image; (ii) a tracking quality threshold; (iii) a feature quality threshold; and (iv) a feature correlation threshold.

6. The method of claim 1, wherein the maximal set selection step utilizes a re-labeling process to select a globally consistent set of image features.

7. The method of claim 1, further comprising the step of utilizing the globally consistent set of image feature correspondences to reconstruct one or more images.

8. The method of claim 7, wherein image reconstruction comprises the steps of:
   determining features common to a group of images based on the globally consistent set of image feature correspondences; and
   warping and combining the images to generate an interpolated novel view of the environment.

9. The method of claim 1, wherein the feature tracking step and the potentially corresponding feature identification step may be interleaved with the maximal set selection step.

10. Apparatus for processing images captured from an environment, comprising:
    a memory; and
    at least one processor coupled to the memory and operative to: (i) detect features in a set of two or more source images; (ii) track the features to destination images that surround the two or more source images; (iii) identify potential correspondences between features from different source images that track to the same image and that satisfy a feature similarity metric; and (iv) select a maximal set of corresponding features from among the potential correspondences to form a set of image feature that is globally consistent across the set of two or more source images.

11. The apparatus of claim 10, wherein the features may be tracked from each source image along a set of non-intersecting paths that spread radially outwards.

12. The apparatus of claim 10, wherein the set of source images comprises a subset of the images captured from the environment.

13. The apparatus of claim 10, wherein the feature similarity metric may be satisfied via any of multiple viewpoint paths between images.

14. The apparatus of claim 13, wherein the feature similarity metric comprises one or more of the following thresholds: (i) a maximum distance in pixels between tracked features in the same image; (ii) a tracking quality threshold; (iii) a feature quality threshold; and (iv) a feature correlation threshold.

15. The apparatus of claim 10, wherein the maximal set selection step utilizes a re-labeling process to select a globally consistent set of image features.

16. The apparatus of claim 10, wherein the at least one processor is further operative to utilize the globally consistent set of image feature correspondences to reconstruct one or more images.

17. The apparatus of claim 16, wherein image reconstruction comprises:
   determining features common to a group of images based on the globally consistent set of image feature correspondences; and
   warping and combining the images to generate an interpolated novel view of the environment.

18. The apparatus of claim 10, wherein the feature tracking operation and the potentially corresponding feature identification operation may be interleaved with the maximal set selection operation.

19. A computer program product for processing images captured from an environment, comprising a computer readable medium containing one or more computer programs which when executed by a computer processor implement the steps of:
   detecting features in a set of two or more source images;
   tracking the features to two or more destination images that surround the two or more source images;
   identifying potential correspondences between features from different source images that track to the same image and that satisfy a feature similarity metric; and
   selecting a maximal set of corresponding features from among the potential correspondences to form a set of image features that globally consistent across the set of two or more source images.

* * * * *